Figure 1:
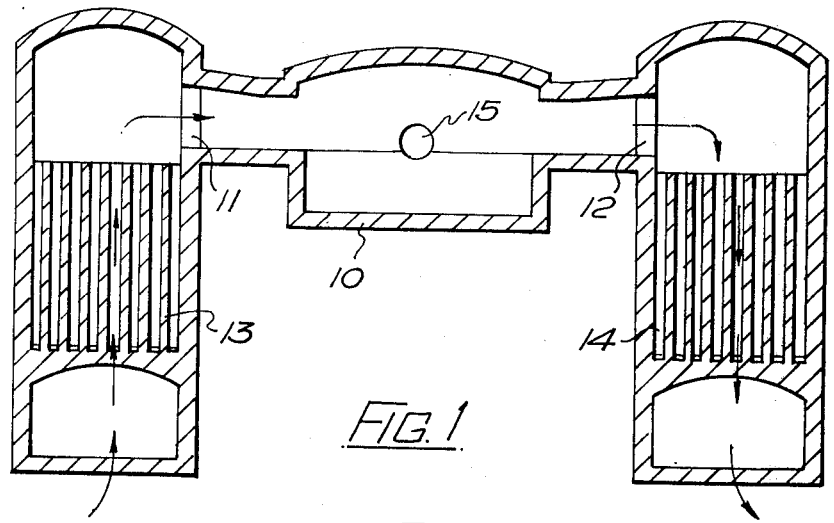

United States Patent [19]

Hemingway et al.

[11] 4,000,962
[45] Jan. 4, 1977

[54] METHOD OF HEATING UP GLASS MELTING FURNACES OR THE LIKE

[75] Inventors: Maurice Hemingway, Mirfield; Trevor Ward, Dewsbury, both of England

[73] Assignee: Hotwork International Limited, England

[22] Filed: May 12, 1975

[21] Appl. No.: 576,263

[30] Foreign Application Priority Data

May 14, 1974 United Kingdom ............ 21175/74

[52] U.S. Cl. .................................... 432/4; 432/181
[51] Int. Cl.² ........................................ F27D 7/00
[58] Field of Search ...................... 432/4, 180, 181

[56] References Cited
UNITED STATES PATENTS

| | | | |
|---|---|---|---|
| 2,920,692 | 1/1960 | Renninger et al. | 432/4 X |
| 3,165,301 | 1/1965 | Riviere | 432/4 |
| 3,434,704 | 3/1969 | Ward | 432/4 |

Primary Examiner—John J. Camby
Attorney, Agent, or Firm—Wolf, Greenfield & Sacks

[57] ABSTRACT

A method of heating up to working temperature from cold, a furnace of the regenerative or recuperative type having its interior lined with refractory material, which method comprises projecting into the furnace from one or more substantially non-radiant high velocity burners a flow of hot gases, causing said gases to circulate around said interior to heat same substantially uniformly, introducing to said interior air (preferably from the normal firing system of the furnace) alternately via one and then the other of the regenerators, and controlling said burner or burners to cause it or them to pass to an excess fuel condition by which said air is consumed within the furnace, thereby pre-heating the furnace and the regenerators up to full working temperature.

2 Claims, 2 Drawing Figures

U.S. Patent     Jan. 4, 1977     4,000,962

METHOD OF HEATING UP GLASS MELTING FURNACES OR THE LIKE

This invention relates to the heating up of glass melting furnaces or other regenerative or recuperative furnaces.

As is known these furnaces use the expended heat before it reaches the flue stack to heat up alternately one or other of two sets of refractory elements comprising the regenerators, each set in turn when not receiving the flue gases being used as a heat exchanger for the combustion air which is thereby pre-heated before passing to the burners.

Raising the temperature of such furnaces from cold to their working temperatures has for long been a problem in view of the risk of cracking and other damage to expensive refractory furnace lining materials if attempts are made to speed the heating up process. The burners used for the process have normally been of the radiant type, but difficulties arise when attempts are made to speed the heating up operation because local overheating can easily be produced with damaging effect on the lining. Thus the starting up of such a furnace is a protracted operation and entails a considerable loss of remunerative output to the glass or other manufacturer after a furnace has been relined, so that any method which can be safely devised to reduce the time required to raise a furnace to its working temperature will constitute a valuable advance in the glass making industry and in many cases where such large furnace equipment is involved.

In an effort to enable the above described heating up process to be speeded, it has been proposed to use a burner of the so called high velocity type arranged to project a volume of hot gases, including the products of combustion of the burner, into a furnace in such a way as to produce a controlled circulation of the hot gases and of the furnace atmosphere within the furnace to give a more uniform and progressively increasing heating effect.

There is still, however, a need for some method of further reducing with safety the heating up period required to bring such furnaces to their working temperatures, and the present invention aims at still further reducing this period.

The invention provides a method of heating up to working temperature from cold, a furnace of the regenerative or recuperative type having its interior lined with refractory material, which method comprises projecting into the furnace from one or more substantially non-radiant high velocity burners a flow of hot gases, causing said gases to circulate around said interior to heat same substantially uniformly, introducing to said interior air (preferably from the normal firing system of the furnace) alternately via one and then the other of the regenerators, and controlling said burner or burners to cause it or them to pass to an excess fuel condition by which said air is consumed within the furnace, thereby pre-heating the furnace and the regenerators up to full working temperature.

The result of this introduction of high velocity heated gases into such a furnace with the burner or burners suitably located and providing an excess fuel condition is to produce an increased but still substantially uniform distribution of the applied heat throughout the furnace which enables the heating up period to be reduced as compared with the period required by previously known methods and with less risk of local overheating and with the additional advantage of producing a substantial pre-heating of the regenerators.

Any suitable type of high velocity burner may be used, for example a tunnel burner, but preferably use will be made of a burner constructed to make available excess fuel in the furnace which can be burnt with the air supply entering the furnace via the normal air passages, thus giving the necessary volume flow of hot waste gases to pre-heat the regenerators to a balanced condition similar to the apertaining under normal working conditions.

Figure 2:
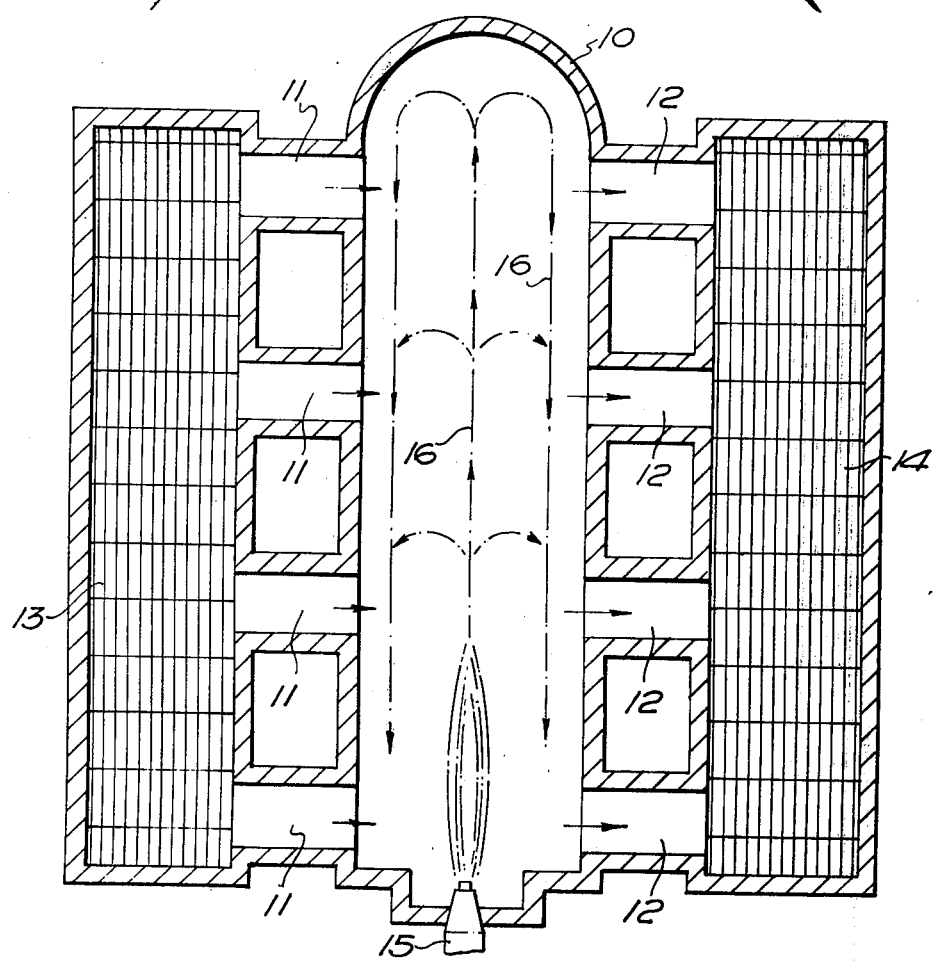

The method according to the invention, is indicated in the accompanying diagrammatic drawings which represent a typical side-port glass melting furnace, FIG. 1 being a vertical section and
FIG. 2 being a horizontal section.

These drawings indicate the glass melting tank 10 communicating on each side via several side ports 11, 12 with regenerators 13, 14, each of which is connectible at its base alternatively with a flue stack or with the normal air supply for the burners which fire the furnace. These firing burners are not used during the carrying out of this invention and they may be removed or withdrawn temporarily. A high velocity burner 15 is introduced through an end wall of the tank 10 to produce circulation of the hot products of combustion and heated air somewhat as indicated by the chain-dotted lines 16. In the drawings air is shown by full-line arrows travelling through regenerator 13 and ports 11 into the tank 10, and the hot gases and air after circulating round the tank are shown by broken-line arrows passing through ports 12 and regenerator 14 to the flue stack. At suitable intervals of time the flow through the regenerators is changed from air to flue gases and vice versa so that as the heating up process proceeds the air entering the tank through the side ports is increasingly pre-heated.

We claim:
1. A method of pre-heating a refractory lined furnace and the regenerators associated with it to bring the furnace and regenerators up to working temperature, comprising the steps of
    1. injecting a flow of hot gases into the furnace from one or more high velocity burners of the nonradiant type whereby the injected gases circulate around the interior of the furnace and heat the interior substantially uniformly,
    2. introducing air to the interior of the furnace alternately through different regenerators that are alternately heated by the hot waste gases flowing from the furnace to the flue, and
    3. causing the one or more burners to pass to an excess fuel condition whereby the air introduced through the regenerators is consumed within the furnace by combustion with the excess fuel.
2. The method according to claim 1 of preheating to bring the furnace and regenerators up to working temperature, wherein
    the air introduced through the regenerators is supplied from the normal firing systems of the furnace.

* * * * *